(12) United States Patent
DeMarco et al.

(10) Patent No.: US 7,747,904 B1
(45) Date of Patent: Jun. 29, 2010

(54) ERROR MANAGEMENT SYSTEM AND METHOD FOR A PACKET SWITCH

(75) Inventors: Stephen Christopher DeMarco, Alpharetta, GA (US); Angus David Starr MacAdam, Atlanta, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 806 days.

(21) Appl. No.: 11/383,121

(22) Filed: May 12, 2006

(51) Int. Cl.
 *G06F 11/00* (2006.01)
(52) U.S. Cl. ...................................... 714/48
(58) Field of Classification Search .................... 714/48
 See application file for complete search history.

(56) References Cited

U.S. PATENT DOCUMENTS

| | | | |
|---|---|---|---|
| 4,473,880 A | 9/1984 | Budde et al. | |
| 4,932,028 A | 6/1990 | Katircioglu et al. | |
| 4,987,529 A | 1/1991 | Craft et al. | |
| 4,991,171 A | 2/1991 | Teraslinna | |
| 5,072,363 A | 12/1991 | Gallagher | |
| 5,229,991 A | 7/1993 | Turner | |
| 5,276,684 A | 1/1994 | Pearson | |
| 5,305,311 A | 4/1994 | Lyles | |
| 5,440,546 A | 8/1995 | Bianchini, Jr. | |
| 5,710,549 A | 1/1998 | Horst et al. | |
| 5,764,927 A | 6/1998 | Murphy et al. | |
| 5,999,981 A | 12/1999 | Willenz | |
| 6,044,085 A | 3/2000 | Horlander | |
| 6,098,110 A | 8/2000 | Witkowski et al. | |
| 6,134,229 A | 10/2000 | Schwaller et al. | |
| 6,377,782 B1 * | 4/2002 | Bishop et al. | 455/3.01 |
| 6,389,479 B1 | 5/2002 | Boucher et al. | |
| 6,598,179 B1 | 7/2003 | Chirashnya et al. | |
| 6,625,121 B1 | 9/2003 | Lau et al. | |
| 6,633,578 B1 | 10/2003 | Matsumaru et al. | |
| 6,647,449 B1 | 11/2003 | Watts | |

(Continued)

FOREIGN PATENT DOCUMENTS

WO 0239667 5/2002

OTHER PUBLICATIONS

"Cisco MDS 9020 Fabric Switch Configuration Guide and Command Reference, Release 2.x," pp. 10-1 through 10-4, Cisco Systems, Inc., Jun. 2005.

(Continued)

*Primary Examiner*—Scott T Baderman
*Assistant Examiner*—Jigar Patel
(74) *Attorney, Agent, or Firm*—Stanley J. Pawlik; Kenneth Glass; Glass & Associates

(57) ABSTRACT

A packet switch includes an error management module in addition to various components that facilitate routing of data packets through the packet switch. The components generate error codes indicating errors occurring in the packet switch and provide the error codes to the error management module. The error management module select error codes generated by the components and generates an error log based on the selected error codes. Each component is inhibited from providing the same error code to the error management module more than once until the component receives an acknowledgement for that error code from the error management module. A user can access the error log during operation of the packet switch to monitor performance of the packet switch.

20 Claims, 10 Drawing Sheets

U.S. PATENT DOCUMENTS

| | | |
|---|---|---|
| 6,661,788 B2 | 12/2003 | Angle et al. |
| 6,662,339 B1 | 12/2003 | Lanemann et al. |
| 6,675,325 B1 | 1/2004 | Garney et al. |
| 6,678,279 B1 | 1/2004 | Meredith |
| 6,804,237 B1 | 10/2004 | Luo |
| 6,882,649 B1 | 4/2005 | Gura et al. |
| 6,937,133 B2 | 8/2005 | Johnson et al. |
| 6,954,463 B1 | 10/2005 | Ma et al. |
| 6,954,811 B2 | 10/2005 | Vishnu |
| 6,954,812 B2 | 10/2005 | Lavigne |
| 6,963,576 B1 | 11/2005 | Lee |
| 6,975,651 B1 | 12/2005 | Ono et al. |
| 6,988,177 B2 | 1/2006 | Sukol |
| 7,006,501 B1 | 2/2006 | Gura et al. |
| 7,020,161 B1 | 3/2006 | Eberle et al. |
| 7,023,840 B2 | 4/2006 | Golla et al. |
| 7,027,443 B2 | 4/2006 | Nichols |
| 7,058,789 B2 | 6/2006 | Henderson et al. |
| 7,106,742 B1 * | 9/2006 | Frisch et al. ............... 370/394 |
| 7,224,671 B2 | 5/2007 | Lee et al. |
| 7,260,120 B2 | 8/2007 | Kang et al. |
| 7,274,705 B2 | 9/2007 | Chang et al. |
| 2001/0014105 A1 | 8/2001 | Tezuka et al. |
| 2001/0020266 A1 | 9/2001 | Kojima et al. |
| 2002/0085550 A1 | 7/2002 | Rhodes |
| 2002/0141256 A1 | 10/2002 | Barri et al. |
| 2003/0110206 A1 | 6/2003 | Osokine |
| 2003/0147394 A1 | 8/2003 | Jennings et al. |
| 2004/0114587 A1 | 6/2004 | Huang et al. |
| 2004/0153835 A1 * | 8/2004 | Song et al. ............... 714/38 |
| 2004/0179535 A1 | 9/2004 | Bertagna |
| 2004/0184466 A1 | 9/2004 | Chang et al. |
| 2004/0258086 A1 | 12/2004 | Kurupati |
| 2005/0058127 A1 | 3/2005 | Munter et al. |
| 2005/0111434 A1 | 5/2005 | Halen |
| 2005/0138055 A1 | 6/2005 | Handlogten |
| 2005/0232201 A1 | 10/2005 | Bysted et al. |
| 2005/0249244 A1 | 11/2005 | McNamara et al. |
| 2006/0007885 A1 | 1/2006 | Pollak et al. |
| 2006/0050738 A1 | 3/2006 | Carr et al. |
| 2006/0075311 A1 * | 4/2006 | Ranjan et al. ............... 714/48 |
| 2006/0128436 A1 | 6/2006 | Doi et al. |
| 2006/0248377 A1 | 11/2006 | Tezcan et al. |
| 2006/0251069 A1 | 11/2006 | Cathey et al. |
| 2007/0072646 A1 | 3/2007 | Kuwahara et al. |
| 2007/0124554 A1 | 5/2007 | Allen et al. |
| 2007/0242599 A1 | 10/2007 | Gorday et al. |
| 2008/0219235 A1 | 9/2008 | Ma et al. |
| 2008/0228871 A1 | 9/2008 | Sano |
| 2008/0275872 A1 | 11/2008 | Venkatcharay et al. |
| 2008/0298492 A1 | 12/2008 | Hwang et al. |

OTHER PUBLICATIONS

Peter J. Welcher, "Configuring SNMP on Switches, and Syslog," Jun. 24, 1999.
"RapidIO Interconnect Specification, Part 8, Error Management, Extensions Specification," RapidIO Trade Association, Jun. 2005.
RapidIO: An Embedded System Component Network Architecture, Feb. 22, 2000, Motorola.
RFC: 791, DARPA Internet Program Protocol Specification, Sep. 1981, Information Science Institute.
802.11 standard, Aug. 21, 2002, http://wlan.nat.sdu.dk/802_11standard.htm.
History of the I2C Bus, Circa 2000, ESAcademy.
International Search Report, PCT/US2006/013767, Jul. 31, 2006.
"Solano Communications IC: A High-Throughput Solution for 3G Wireless and Broadband Base Stations," Spectrum Wireless Systems, Admitted Prior Art, 4 pages.
"Tsi568A: Serial RapidIO Switch," Tundra Semiconductor Corp., Printed From Internet Feb. 17, 2005, 4 pages.
"RapidIO: An Embedded System Component Network Architecture," Architecture and Systems Platforms, Motorola Semiconductor Product Sector, Feb. 22, 2000, 25 pages.
Bertan Tezcan and Bill Beane, "How to achieve low-cost, reusable wireless infrastructure through modular baseband design," Wireless Net DesignLine, Aug. 8, 2006, available at http://www.wirelessnetdesignline.com.
Bertan Tezcan and Bill Beane, "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.
Bertan Tezcan and Bill Beane, "Modular baseband design—Enabling a low-cost reusable wireless infrastructure(Part I)," Portable Design Online Article, Feb. 15, 2007, previously available at http://pd.pennnet.com.
Bertan Tezcan and Bill Beane, "Modular baseband design—Enabling a low-cost reusable wireless infrastructure(Part II)," Portable Design Online Article, Feb. 15, 2007, previously available at http://pd.pennnet.com.
Lukas Sekanina and Vladimir Drabek, "Theory and Applications of Evolvable Embedded Systems," Proceedings of the 11th IEEE International Conference and Workshop on the Engineering of Computer-Based Systems (ECBS'04), 2004.

* cited by examiner

ERROR MANAGEMENT SYSTEM AND METHOD FOR A PACKET SWITCH

CROSS-REFERENCE TO RELATED APPLICATIONS

The present application is related to co-pending U.S. patent application Ser. No. 11/395,575, filed Mar. 31, 2006, entitled "Combined Packet Processor and RIO Switch on Single Chip for DSP Clustered Applications," co-pending U.S. patent application Ser. No. 11/394,886, filed Mar. 31, 2006, entitled "Allocating Destination Addresses to a Switch to Perform Packet Processing on Selected Packets with Corresponding Destination Address," co-pending U.S. patent application Ser. No. 11/395,570, filed Mar. 31, 2006, entitled "Performing Packet Manipulation Options to Transform Packet Data to a Format More Compatible with Processor," co-pending U.S. patent application Ser. No. 11/383,165, filed May 12, 2006, entitled "Packet Processing in a Packet Switch with Improved Output Data Distribution," and co-pending U.S. patent application Ser. No. 11/383,150, filed May 12, 2006, entitled "System and Method of Constructing Data Packets in a Packet Switch," each of which is incorporated herein by reference its entirety.

BACKGROUND

1. Field of the Invention

The present invention generally relates to packet switching networks, and more particularly to managing errors occurring in a packet switch.

2. Description of Related Art

Modern telecommunication networks include packet switching networks for transmitting data from a source device to a destination device. The data is split up and encapsulated into data packets along with a destination address of the data. The packet switching network individually routes each data packet through a network of interconnected packet switches based on the destination address in the data packet. The data packets may be routed through different paths in the packet switching network and generally arrive at the destination device in an arbitrary order. At the destination device, the data is reconstructed from the data packets.

A packet switching network often includes an error reporting mechanism for reporting errors that may occur during transmission of data packets through the packet switching network. For instance, the error reporting mechanism may indicate that a data packet was not successfully routed through the packet switching network. Such an error reporting mechanism is often used to monitor performance of the packet switching network. In some cases, however, it is desirable to monitor errors occurring in an individual packet switch.

In light of the above, a need exists for reporting errors occurring in a packet switch. A further need exists for monitoring performance of a packet switch during operation of the packet switch.

SUMMARY

In various embodiments, a packet switch includes components that facilitate routing of data packets through the packet switch. Further, the packet switch includes an error management module. The components generate error codes indicating errors occurring in the packet switch and provide the error codes to the error management module. The error management module selects each error code received from the components and generates an error log based on the selected error codes. Additionally, the error management module provides an acknowledgement to each component that generated one of the selected error codes. Each component is inhibited from providing the same error code to the error management module more than once until the component receives an acknowledgement for that error code. In this way, the number of error codes received by the error management module is reduced. A user can access the error log during operation of the packet switch to monitor performance of the packet switch.

A packet switch, in accordance with one embodiment, includes one or more components to facilitate routing of data packets though the packet switch. The packet switch also includes an error management module. One or more of the components generate error codes and provide the error codes to the error management module. The error management module selects at least one of the error codes and generates an error log including the error code.

In a method for managing errors in a packet switch, in accordance with one embodiment, one or more components of the packet switch generate error codes. At least one error code is selected and an error log including the selected error code is generated in the packet switch.

A packet switch, in accordance with one embodiment, includes a means for routing data packets and a means for generating error codes. Each error code identifies an error occurring in the packet switch. The packet switch further includes a means for generating an error log based on the error codes.

A system, in accordance with one embodiment, includes a packet switch and one or more signal processors coupled to the packet switch. The packet switch receives data packets and preprocesses the data packets. At least one signal processor receives the preprocessed data packets from the packet switch and further processes the preprocessed data packets. The packet switch includes at least one component to facilitate routing of data packets through the packet switch and to generate error codes. Additionally, the packet switch includes an error management module. One or more of the components provide the error codes to the error management module, and the error management module selects one or more of the error codes. Further, the error management module generates an error log including the selected error codes.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a packet switch receives a data packet and routes the data packet through the packet switch or processes the data packet. The packet switch processes the data packet by performing one or more operations of a packet processing scenario on a data payload of the data packet to generate another data packet. The packet switch then routes the generated data packet through the packet switch. The packet switch includes an error management module, which generates an error log indicating errors occurring during operation of the packet switch. A user can access the error log to monitor performance of the packet switch during operation of the packet switch.

Figure 1:
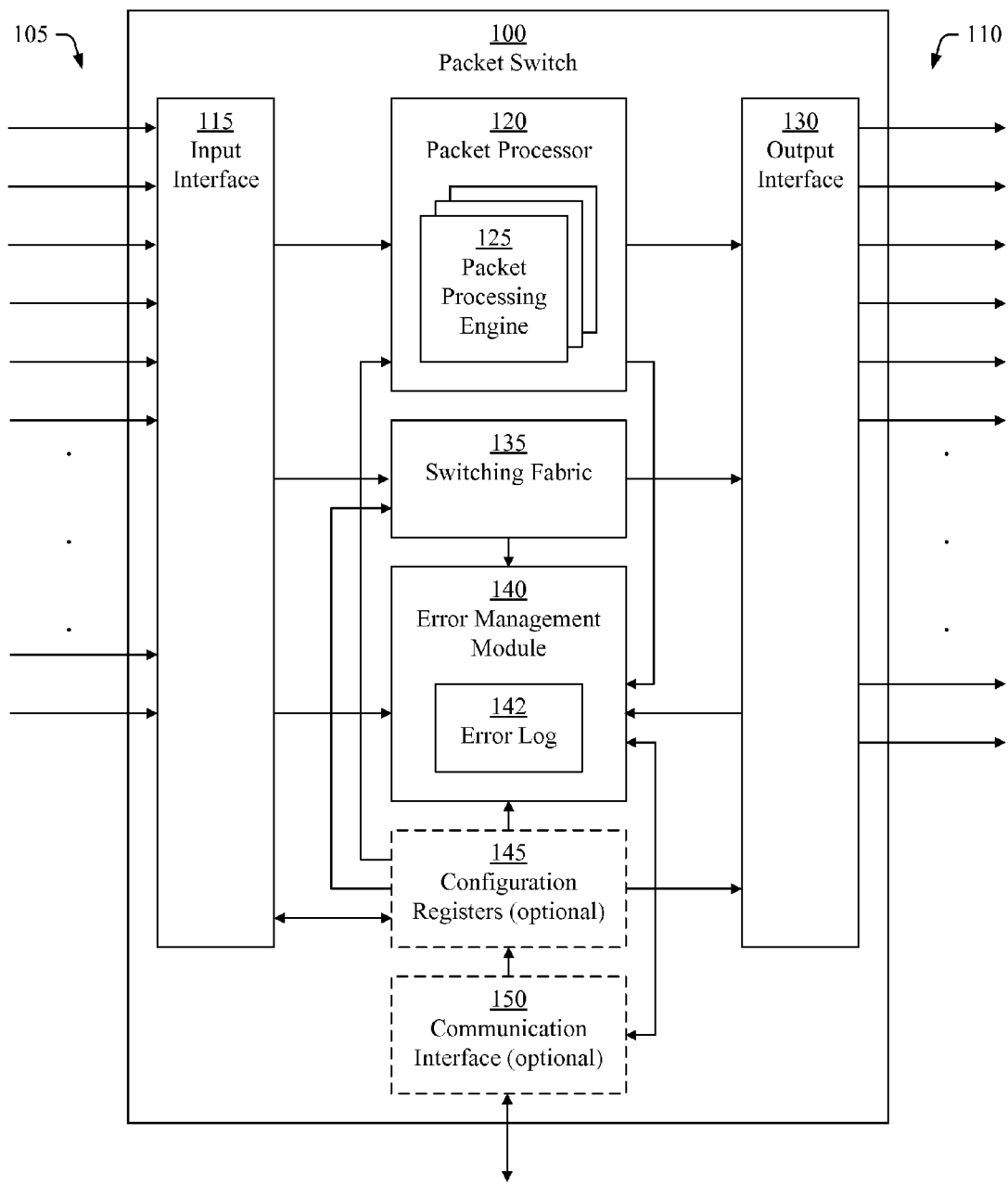
FIG. 1 is a block diagram of a packet switch, in accordance with an embodiment of the present invention.

FIG. 1 illustrates a packet switch 100, in accordance with an embodiment of the present invention. The packet switch 100 includes input ports 105, output ports 110, an input interface 115, an output interface 130, a packet processor 120, a switching fabric 135, and an error management module 140. The packet processor 120 and the switching fabric 135 are each coupled to both the input interface 115 and the output interface 130. The error management module 140 is coupled to the input interface 115, the output interface 130, the packet processor 120, and the switching fabric 135. In one embodiment, the packet switch 100 is implemented in an integrated circuit, which may be packaged as a computer chip.

The input interface 115 receives data packets from external sources of the packet switch 100 at the input ports 105 and individually routes the data packets to the packet processor 120 or the switching fabric 135 based on the content of the data packets. The switching fabric 135 routes data packets received from the input interface 115 to the output interface 130 based on the content of the data packets. The packet processor 120 processes data packets received from the input interface 115 to generate data packets based on the content of the received data packets, and routes the generated data packets to the output interface 130. The input interface 115, the packet processor 120, and the switching fabric 135 can route a data packet, for example, based on a destination identifier in the data packet. The output interface 130 receives data packets from the packet processor 120 and the switching fabric 135 and transmits the data packets to external recipients through the output ports 110. The error management module 140 generates an error log 142 indicating errors occurring during operation of the packet switch 100. A user can access the error log during operation of the packet switch 100 to monitor performance of the packet switch 100.

In various embodiments, the packet processor 120 generates data packets based on data packets received from the input interface 115 and according to one or more packet processing scenarios. The packet processor 120 includes one or more packet processing engines 125 for performing packet processing scenarios on the data packets received from the input interface 115. Each packet processing scenario includes one or more operations to be performed on the data packets received from the input interface 115. The operations of the packet processing scenarios may include operations for manipulating data payloads in the data packets received from the input interface 115. For example, the operations may involve bit extension, bit truncation, bit reordering (e.g., interleaving and/or flipping), or combining (e.g., summing or other arithmetic operations) of data payloads. When used in a signal processing application such as a wireless base station, for example, the packet switch 100 can perform operations on data payloads of the data packets to facilitate baseband processing operations performed downstream of the packet switch 100.

In one embodiment, destination identifiers of the data packets are associated with respective packet processing scenarios. The input interface 115 routes a data packet containing a destination identifier associated with a packet processing scenario to a packet processing engine 125 associated with the packet processing scenario. In turn, the packet processing engine 125 performs the packet processing scenario on the data packet. In this embodiment, the input interface 115 routes data packets containing destination identifiers not associated with a packet processing scenario to the switching fabric 135. In turn, the switching fabric 135 routes the data packets to the output interface 130 based on the destination identifiers of the data packets. Such an approach may be advantageous because any processing of the data packets according to the packet processing scenarios is transparent to the external source and/or the external recipient of the data packets.

The error management module 140 receives error codes generated by one or more components of the packet switch 100 and generates the error log 142 based on the error codes. The components of the packet switch 100 may include the input interface 115, the packet processor 120, the switching fabric 135, and the output interface 135. The error management module 150 may receive error codes from more or fewer components of the packet switch 100 in other embodiments. An error code identifies an error in operation of the packet switch 100 and may identify the component in which the error occurred. For example, an error code may indicate that a component of the packet switch 100 dropped a data packet or received an invalid data packet. As another example, an error code may indicate an error that occurred in a packet processing engine 125 during processing of a packet processing scenario.

The error codes can indicate incorrect programming of the configuration registers 145 (FIG. 1). For example, an error code may indicate that a packet processing scenario is configured to route a data packet to a nonexistent output port 110 (FIG. 1) As another example, an error code can indicate an illegal value stored in the configuration registers 145. Thus, the error management module 140 can validate configuration data stored in the configuration registers 145 in addition to functioning as a run-time error checker.

The error log 142 may be a table or a list of error codes received by the error management module 140. Further, the error log 142 can indicate the order in which the error management module 140 receives the error codes. In various embodiments, the error management module 140 stores the error log 142, which may be accessed in the error management module 140 through the input interface 115 or the communication interface 150, or both. For example, a user can access the error log 142 in the error management module 140 during operation of the packet switch 100. In this way, the use can monitor performance of the packet switch 100 in real-time.

In one embodiment, the error management module 140 generates an acknowledgement and provides the acknowledgment to the component of the packet switch 100 that generated an error code selected by the error management module 140. The error management module 140 may generate the acknowledgement in response to selecting the error code generated by the component of the packet switch 100. Further, the component may be inhibited from providing the same error code to the error management module 140 more than once until the component receives an acknowledgment for that error code. In a further embodiment, the component is inhibited from generating the same error code more than once until the component receives an acknowledgement for that error code from the error management module 140. In this way, the number of error codes received by the error management module 140 is reduced.

In some embodiments, the packet switch 100 may optionally include one or more configuration registers 145. The configuration registers 145 are coupled to components of the packet switch 100, including the input interface 115, the output interface 130, the packet processor 120, the switching fabric 135, and the error management module 140. In other embodiments, the configuration registers 145 may be coupled to more or fewer components of the packet switch 100. Further, the packet switch 100 may optionally include a communication interface 150. The communication interface 150 is coupled to the error management module 140 and the configuration registers 145. The communication interface 150 may be an Inter-Integrated Circuit ($I^2C$) bus interface, a Joint Test Action Group (JTAG) interface, or any other interface that facilitates communication with the packet switch 100.

The configuration registers 145 store configuration data for configuring the packet switch 100. For example, the configuration data may include parameters for defining the function of various components of the packet switch 100. The parameters may define various port configurations, packet processing scenarios, switching functions, communications protocols, and/or messaging formats of the packet switch 100. A user may configure the packet switch 100 by writing configuration data into the configuration registers 145 through the input interface 115 or the communication interface 150.

The configuration registers 145 may include registers to configure speed, timing, and/or other characteristics of the input ports 105 and/or the output ports 110. For example, the configuration registers 145 can be configured to handle long and short haul serial transmission as defined, for example, by a RapidIO™ serial specification, an open standard governed by the RapidIO Trade Association of Austin, Tex. The configuration registers 145 can be configured, for example, during an initialization procedure.

The configuration registers 145 may include registers to configure packet processing scenarios. For example, the configuration registers 145 may define payload formats and operations performed on data payloads of data packets for a packet processing scenario. The packet processing scenarios performed by the packet processing engines 125 may include individual packet processing scenarios or group packet processing scenarios. The packet processor 120 can perform a group packet processing scenario by multicasting data packets to multiple packet processing engines 125. In turn, the packet processing engines 125 can perform packet processing scenarios on the data packets in parallel. Such groupings of individual packet processing scenarios may be configurable, for example, by using the configuration registers 145.

In some embodiments, the input interface 115 has a default (e.g., power-on) configuration to enable communication between the packet switch 100 and an external source. For example, the input interface 115 can receive data packets containing configuration data from an external source and can write the configuration data into the configuration registers 145. In this way, the external source can write configuration data into the configuration registers 145 to configure the packet switch 100.

In various embodiments, the packet switch 100 may be configured to provide packet communications compliant with the RapidIO™ interconnect architecture, an open standard governed by the RapidIO Trade Association of Austin, Tex. The RapidIO™ interconnect architecture includes physical and logical communications specifications for inter-device communications. Although some embodiments described herein relate to RapidIO™ compliant packet switches and operations thereof, the present invention may use other packet communication architectures.

In various embodiments, the packet processor 120 may include a microprocessor, an embedded processor, a microcontroller, a digital signal processor, a logic circuit, software, computing instructions, or any other software or hardware technology for processing data packets. The switching fabric 135 can include any switch, switch interconnect, switching network, software, device, or any hardware or software technology for routing data packets. For example, the switching fabric 135 may include one or more logic circuits interconnected in a switching network.

Figure 2:
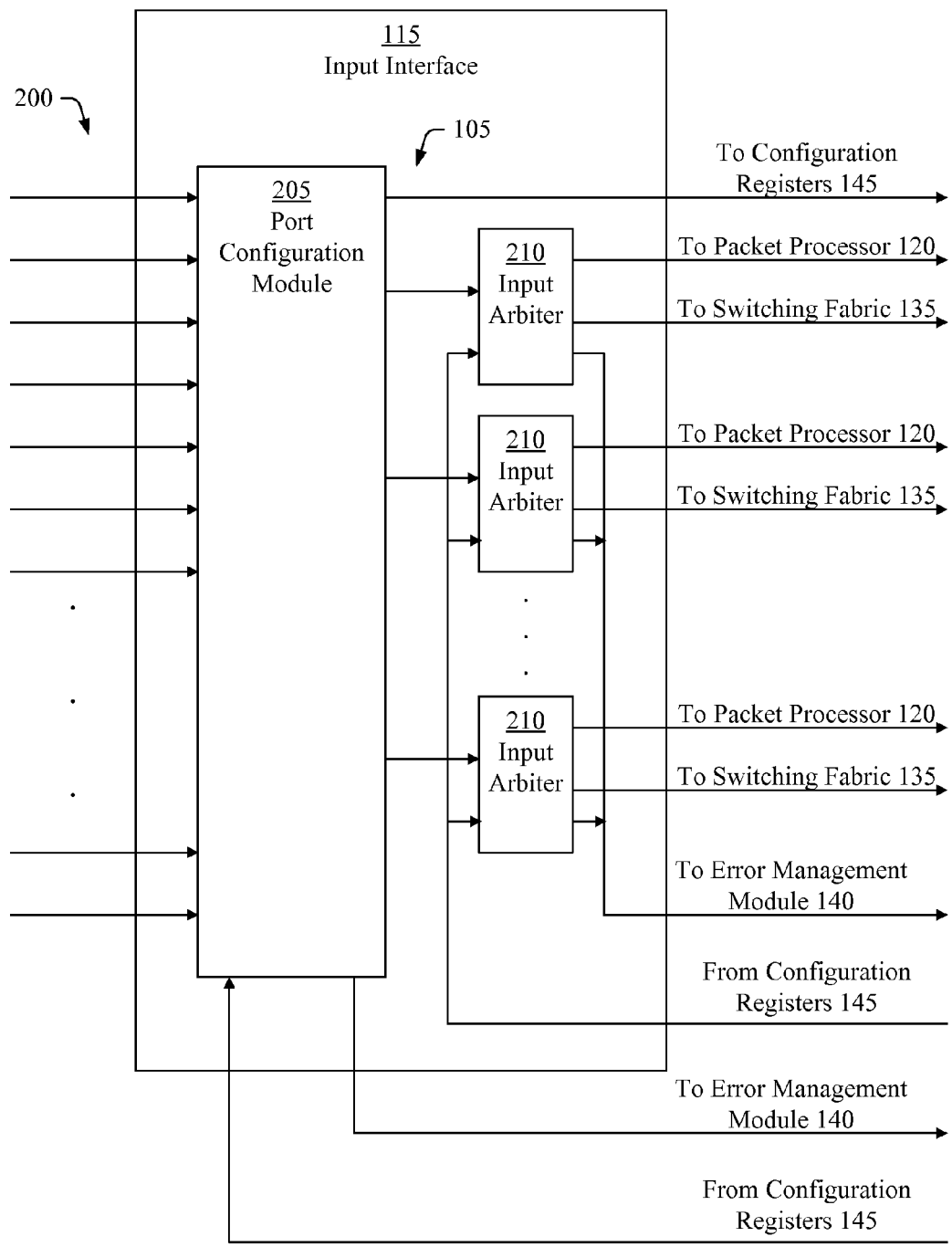
FIG. 2 is a block diagram of an input interface, in accordance with an embodiment of the present invention.

FIG. 2 illustrates the input interface 115, in accordance with an embodiment of the present invention. The input interface 115 includes a port configuration module 205 and input arbiters 210. In this embodiment, the packet switch 100 (FIG. 1) includes input links 200 coupled to the input interface 115, and the input ports 105 are internal of the packet switch 100. The port configuration module 205 is coupled to the input ports 105 and associates at least some of the input links 200 to at least some of the input ports 105. The input arbiters 210 are coupled to and associated with respective input ports 105.

The port configuration module 205 receives a data packet from an external source of the packet switch 100 at an input link 200 and passes the data packet to the input port 105 associated with the input link 200. In turn, the input arbiter 210 routes the data packet to the packet processor 120 (FIG. 1) or the switching fabric 135 (FIG. 1) based on the content of the data packet. In some embodiments, the port configuration module 205 is coupled to the configuration registers 145 (FIG. 1) through one of the input ports 105. In this way, an external source of the packet switch 100 (FIG. 1) can write configuration data into the configuration registers 145.

In various embodiments, the port configuration module 205 or the input arbiters 210, or both, are coupled to the configuration registers 145 (FIG. 1). In these embodiments, the configuration registers 145 can configure the port configuration module 205 or the input arbiters 210. The configuration registers 145 can configure the port configuration module 205 to associate input links 200 to input ports 105. Further, the configuration registers 145 can configure the input arbiters 210 to identify a data packet associated with a packet processing scenario, for example based on a destination identifier in the data packet. In some embodiments, the port configuration module 205 or the input arbiters 210, or both, are coupled to the error management module 140 (FIG. 1). In these embodiments, the port configuration module 205 or the input arbiters 210 can generate error codes and provide the error codes to the error management module 140.

In some embodiments, the port configuration module 205 can associate one input link 200 to one input port 105, or the port configuration module 205 can associate multiple input links 200 to a single input port 105. In one embodiment, the input links 200 are contained in groups of input links 200 and the input ports 105 are contained in groups of input ports 105. For example, each group of input links 200 may include four input links 200, and each group of input ports 105 may include four input ports 105. The port configuration module 205 associates one or more input links 200 in a group of input links 200 with one or more input ports 105 in an associated group of input ports 105. The port configuration module 205 can associate each input link 200 in the group of input links 200 with a respective input port 105 in the group of input ports 105. Instead, the port configuration module 205 can associate one input link 200 in the group of input links 200 with one input port 105 in the group of input ports 105 such that any remaining input link 200 in the group of input links 200 is not associated with an input port 105. Alternatively, the port configuration module 205 can associate all the input links 200 in the group of input links 200 with a single input port 105 in the group of input ports 200 such that any remaining input port 105 in the group of input ports 105 is not associated with an input link 200. Other associations between the group of input links 200 and the group of input ports 105 are possible.

Figure 3:
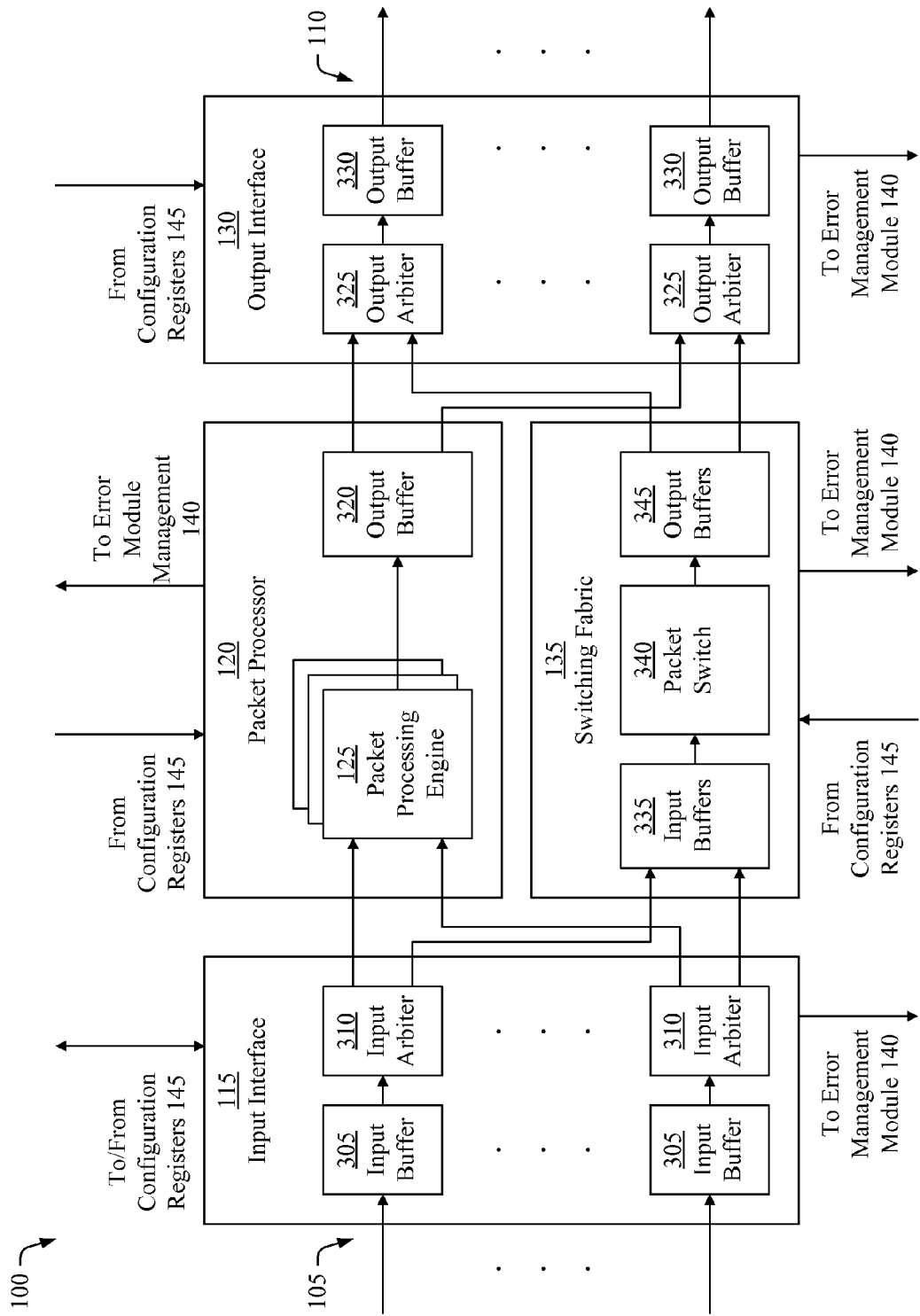
FIG. 3 is a block diagram of portions of a packet switch, in accordance with an embodiment of the present invention.

FIG. 3 illustrates portions of the packet switch 100, in accordance with an embodiment of the present invention. The input interface 115 includes input buffers 305 and input arbiters 310. Each of the input buffers 305 is coupled to and associated with one of the input ports 105 and one of the input arbiters 310. Additionally, each of the input arbiters 310 is coupled to the packet processor 120 and the switching fabric 135. The input buffer 305 receives data packets at the input port 105 associated with the input buffer 305 and passes the data packets to the arbiter 310 associated with the input buffer 305. In turn, the input arbiter 310 routes each of the data packets received from the input buffer 305 to either the packet processor 120 or the switching fabric 135 based on the content of the data packet. The input buffer 305 may include a First-In-First-Out (FIFO) queue for storing the data packets received at the input port 105. The input arbiter 310 may include a demultiplexer or a packet switch for routing the data packets to the packet processor 120 or the switching fabric 135.

The output interface 130 includes output arbiters 325 and output buffers 330. Each of the output buffers 330 is coupled to and associated with one of the output arbiters 325. Additionally, each of the output buffers 330 is coupled to and associated with one of the output ports 110. The output arbiter 325 receives data packets from the packet processor 120 and the switching fabric 135, and passes the data packets to the output buffer 330 associated with the output arbiter 325. Additionally, the output arbiter 325 may include one or more data buffers for storing the data packets received from the packet processor 120 and the switching fabric 135. Further, the output arbiter 325 may determine an order for passing the data packets stored in the output arbiter 325 to the output buffer 330, for example by using a round robin algorithm. The output arbiter 325 may include a multiplexer or a packet switch for passing data packets from the packet processor 120 and the switching fabric 135 to the output buffer 330. The output buffer 330 provides the data packets to the output port 110 associated with the output buffer 330 and may transmit the data packets to an external recipient of the packet switch 100. The output buffer 330 may include a FIFO queue for storing the data packets received from the output arbiter 325 associated with the output buffer 330.

The packet processor 120 includes the packet processing engines 125 and an output buffer 320. Each packet processing engine 125 is coupled to the input arbiters 310. The output buffer 320 is coupled to the packet processing engines 125 and to the output arbiters 325 of the output interface 130. The packet processing engines 125 receive data packets from the input arbiters 310 and generate data packets based on the data packets received from the input arbiters 310. The packet processing engines 125 write the generated data packets into the output buffer 320 based on packet processing scenarios. For example, a packet processing engine 125 can write a data packet into the output buffer 320 based on configuration data defining a packet processing scenario in the configuration registers 145 (FIG. 1). Further, the output buffer 320 provides the data packets received from the packet processing engines 125 to the output arbiters 325 based on the configuration data in the configuration registers 145.

In one embodiment, the output buffer 320 can store two data packets. In this way, a packet processing engine 125 can write a data packet into the output buffer 320 while the output buffer 320 routes another data packet, which is contained in the output buffer 320, to one of the output arbiters 325. In other embodiments, the output buffer 320 can store more or fewer data packets.

In one embodiment, the input interface 115 receives at an input port 305 one or more data packets associated with a packet processing scenario and one or more data packets not associated with any packet processing scenario. The input interface 115 routes any data packet associated with the packet processing scenario to the packet processor 120 in the order in which the data packets are received by the input interface 115. Similarly, the input interface 115 routes any received data packet not associated with a packet processing scenario to the switching fabric 135 in the order the data packets are received by the input interface 115. Moreover, the input interface 115 can route the data packets not associated with a packet processing scenario to the switching fabric 135 while the packet processing engine 120 performs the packet processing scenario on the data packets received from the input interface 115. In this way, the input interface 115 can route data packets to the switching fabric 135 between accumulation periods of the packet processing scenario.

The switching fabric 135 includes input buffers 335, a packet switch 340, and output buffers 345. The input buffers 335 are coupled to the input arbiters 310 of the input interface 115 and the packet switch 340. The output buffers 345 are coupled to the packet switch 340 and the output arbiters 325 of the output interface 130. Moreover, each output buffer 345 is associated with one of the output arbiters 325. The packet switch 340 routes data packets received by the input buffers 335 to the output buffers 345 based on the content of the data packets. For example, the packet switch 340 can route a data packet from an input buffer 335 to an output buffer 345 based on a destination identifier in the data packet. The output buffer 345 provides the data packet to the output arbiter 325 associated with the output buffer 345.

In one embodiment, the input arbiters 310 provide data packets received from the input buffers 305 of the input interface 115 to the input buffers 335 of the switching fabric 135 according to priorities of the data packets. For example, the data packets received by the input buffers 335 may be RapidIO™ packets that include a priority. Moreover, each input buffer 335 may be configured to receive data packets based on a priority of the data packets. For example, the configuration registers 145 (FIG. 1) can be configured such that an input buffer 335 receives data packets having a selected RapidIO™ priority level (e.g., priority level 0, 1, 2 or 3).

Figure 4:
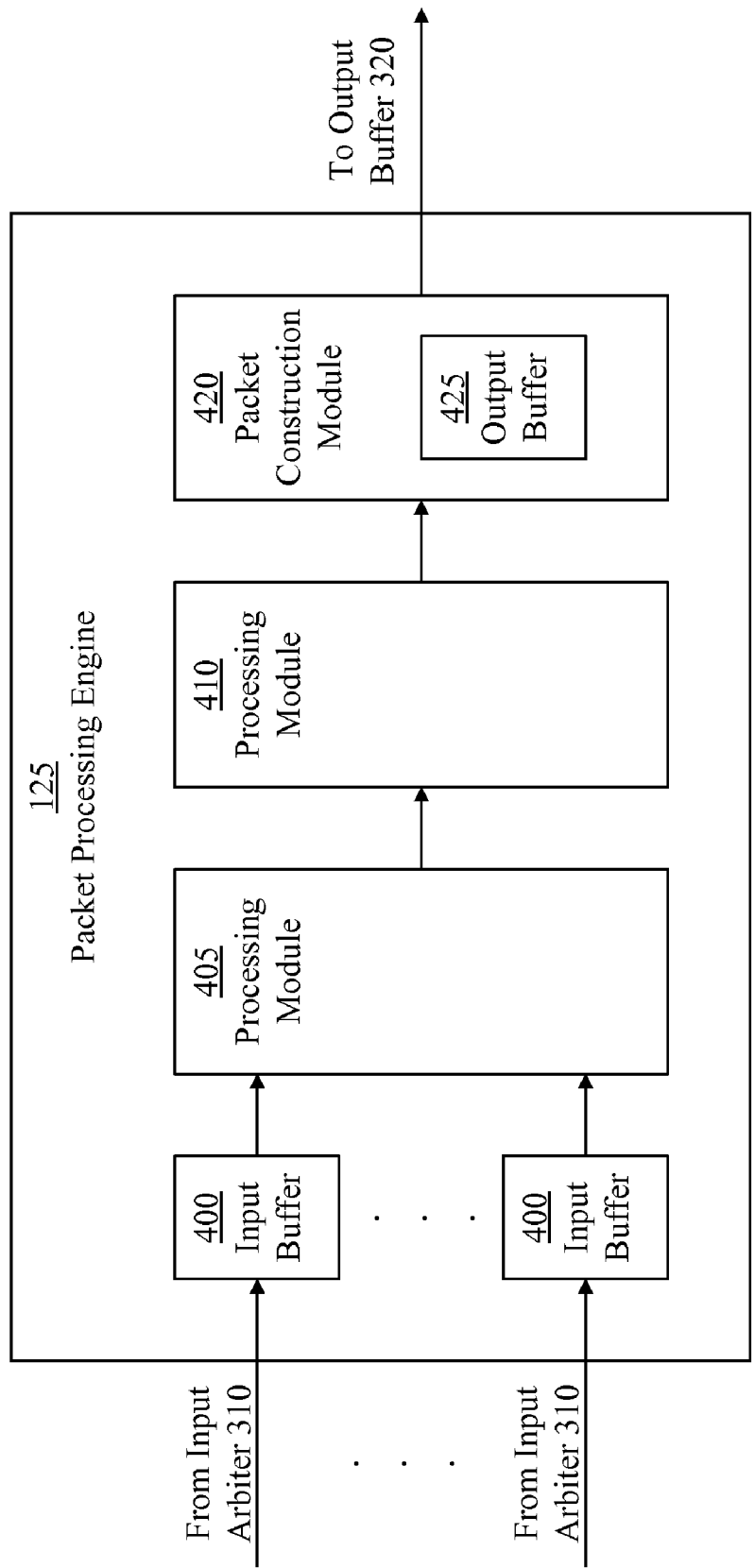
FIG. 4 is a block diagram of a packet processing engine, in accordance with an embodiment of the present invention.

FIG. 4 illustrates the packet processing engine 125, in accordance with an embodiment of the present invention. The packet processing engine 125 includes input buffers 400, a processing module 405, a processing module 410, and a packet construction module 420. Each of the input buffers 400 is coupled to one of the input arbiters 310 (FIG. 3) and to the processing module 405. Additionally, the processing module 405 is coupled to the processing module 410. The packet construction module 420 is coupled to the processing module 410 and the output buffer 320 (FIG. 3) of the packet processor 120.

The input buffers 400 receive data packets from the corresponding input arbiters 310 (FIG. 3). The processing module 405 reads the data packets in the input buffers 400 and performs one or more operations on the data packets according to a packet processing scenario. The operations of the packet processing scenario may include identifying data portions of the data payload in the data packet, increasing (padding) or decreasing the number of bits in one or more of the data portions, flipping the order of data bits in the data portions, and/or flipping the order of the data portions. The processing module 405 then provides the data portions to the processing module 410.

The processing module 410 can perform operations on the data portions received from the processing module 405 according to the packet processing scenario before providing the data portions to the packet construction module 420. The packet construction module 420 includes a data buffer 425 for storing the data portions received from the processing module 405. In one embodiment, the processing module 410 queues the data portions received from the processing module 405 and provides the data portions to the packet construction module 420 in the order the data portions are received from the processing module 405 (e.g., in a first-in-first-out order). The packet construction module 420 constructs a data packet based on the data portions received from the processing module 410. Additionally, the packet construction module 420 provides the constructed data packet to the output buffer 320 (FIG. 3). For example, the packet construction module 420 can provide the constructed data packet to the output buffer 320 based on a register in the packet processing engine 125 (FIG. 1) containing configuration data for a packet processing scenario. In other embodiments, the packet construction module 420 can construct multiple data packets based on the data portions received from the processing module 410. Although two processing modules 405 and 410 are illustrated in FIG. 4, the packet processing engine 125 may have more or fewer processing modules 405 or 410 arranged in other configurations.

A data packet received by the packet processing engine 125 may include a data payload including an imaginary data portion (I) and a quadrature data portion (Q). The processing modules 405 or 410 may extend/truncate these data portions, reorder these data portions, or reorder data bits in these data portions. For example, the data payload of the data packet may include an imaginary data portion (I) including four data bits ($I_0$ $I_1$ $I_2$ $I_3$) followed by a quadrature data portion (Q) including four data bits ($Q_0$ $Q_1$ $Q_2$ $Q_3$). Example operations of a packet processing scenario performed on exemplary data portions are described below. The processing module 405 or 410 may sign extend the least significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $I_1$ $I_2$ $I_3$ $I_3$ $I_3$ $Q_0$ $Q_1$ $Q_2$ $Q_3$ $Q_3$ $Q_3$ |

The processing module 405 or 410 may sign extend the most significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $I_0$ $I_0$ $I_1$ $I_2$ $I_3$ $Q_0$ $Q_0$ $Q_0$ $Q_1$ $Q_2$ $Q_3$ |

The processing module 405 or 410 may flip the data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_3$ $I_2$ $I_1$ $I_0$ $Q_3$ $Q_2$ $Q_1$ $Q_0$ |

The processing module 405 or 410 may reorder data portions as follows:

| Input data portions: | $I_0$ $I_1$ $I_2$ $I_3$ $Q_0$ $Q_1$ $Q_2$ $Q_3$ |
|---|---|
| Output data portions: | $Q_0$ $Q_1$ $Q_2$ $Q_3$ $I_0$ $I_1$ $I_2$ $I_3$ |

The processing module 405 or 410 may interleave data bits of data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $Q_0$ $I_1$ $Q_1$ $I_2$ $Q_2$ $I_3$ $Q_3$ |

The processing module 405 or 410 may perform post dynamic ranging on data bits of data portions as follows:

| Input data portions: | $I_0$ $I_1$ $I_2$ $I_3$ $I_4$ $I_5$ $I_6$ $I_7$ $Q_0$ $Q_1$ $Q_2$ $Q_3$ $Q_4$ $Q_5$ $Q_6$ $Q_7$ |
|---|---|
| Output data portions: | $I_4$ $I_5$ $I_6$ $I_7$ $Q_4$ $Q_5$ $Q_6$ $Q_7$ |

The processing modules 405 and 410 may sum data portions as follows:

| Input data portions: | $I_{00}$ $Q_{00}$ $I_{01}$ $Q_{01}$ $I_{02}$ $Q_{02}$ $I_{03}$ $Q_{03}$ $I_{10}$ $Q_{10}$ $I_{11}$ $Q_{11}$ $I_{12}$ $Q_{12}$ $I_{13}$ $Q_{13}$ |
|---|---|
| Output data portions: | $I_{R0}$ $Q_{R0}$ $I_{R1}$ $Q_{R1}$ $I_{R2}$ $Q_{R2}$ $I_{R3}$ $Q_{R3}$ | where $I_{Ri} = I_{0i} + I_{1i}$ and $Q_{Ri} = Q_{0i} + Q_{1i}$, for i=0 to 3

The processing modules 405 or 410 may perform a sequence of operations on the data portions (I and Q) according to the packet processing scenario. For example, assuming that input data portions have an IQ format, are IQ interleaved, and each of the I and Q data portions has 6 bits, the processing modules 405 or 410 may perform the following sequence of operations to produce an interleaved, IQ-flipped, sign-extended output.

| Input: | $I_0$ $Q_0$ $I_1$ $Q_1$ $I_2$ $Q_2$ $I_3$ $Q_3$ $I_4$ $Q_4$ $I_5$ $Q_5$ |
|---|---|
| Deinterleave I and Q: | $I_0$ $I_1$ $I_2$ $I_3$ $I_4$ $I_5$ $Q_0$ $Q_1$ $Q_2$ $Q_3$ $Q_4$ $Q_5$ |
| Sign extend LSB to 8 bits: | $I_0$ $I_1$ $I_2$ $I_3$ $I_4$ $I_5$ $I_5$ $I_5$ $Q_0$ $Q_1$ $Q_2$ $Q_3$ $Q_4$ $Q_5$ $Q_5$ $Q_5$ |
| Flip: | $I_5$ $I_5$ $I_5$ $I_4$ $I_3$ $I_2$ $I_1$ $I_0$ $Q_5$ $Q_5$ $Q_5$ $Q_4$ $Q_3$ $Q_2$ $Q_1$ $Q_0$ |
| Change IQ order: | $Q_5$ $Q_5$ $Q_5$ $Q_4$ $Q_3$ $Q_2$ $Q_1$ $Q_0$ $I_5$ $I_5$ $I_5$ $I_4$ $I_3$ $I_2$ $I_1$ $I_0$ |
| IQ Output Interleave: | $Q_5$ $I_5$ $Q_5$ $I_5$ $Q_5$ $I_5$ $Q_4$ $I_4$ $Q_3$ $I_3$ $Q_2$ $I_2$ $Q_1$ $I_1$ $Q_0$ $I_0$ |

In other embodiments, the packet processing engine 125 can perform other operations according to the packet processing scenario. For example, the packet processing scenario may include summing or other arithmetic operations on data payloads from multiple data packets.

Figure 5:
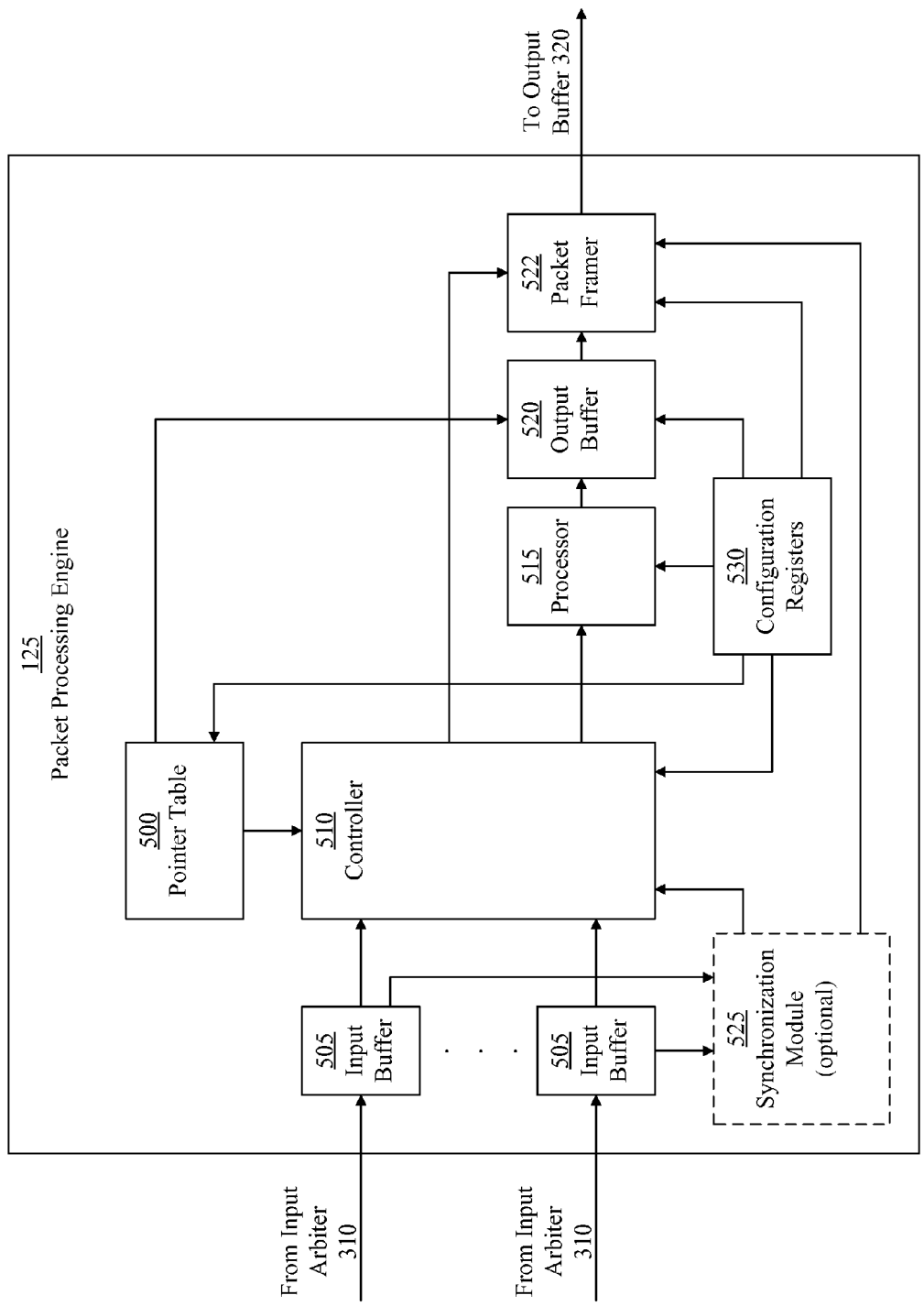
FIG. 5 is a block diagram of a packet processing engine, in accordance with an embodiment of the present invention.

FIG. 5 illustrates the packet processing engine 125, in accordance with another embodiment of the present invention. The packet processing engine 125 includes a pointer table 500, input buffers 505, a controller 510, a processor 515, an output buffer 520, a packet framer 522, and configuration registers 530. The input buffers 505 are data buffers coupled to corresponding input arbiters 310 (FIG. 3) and to the controller 510. The pointer table 500 is coupled to the controller 510 and the output buffer 520. The processor 515 is coupled to the controller 510 and the output buffer 520. The packet framer 522 is coupled to the output buffer 520 and to the output buffer 320 (FIG. 3) of the packet processor 120. The configuration registers 530 are coupled to the pointer table 500, the controller 510, the processor 515, the output buffer 520, and the packet framer 522.

The input buffer 505 receives data packets from the input arbiters 310 (FIG. 3). The pointer table 500 associates input data locations in the input buffer 505 to output data locations in the output buffer 520 according to a packet processing scenario defined by configuration data stored in the configuration registers 530. The pointer table 500 may be, for example, a data memory or a data structure for storing pointers, each of which maps an input location in the input buffer 505 to an output location in the output buffer 520. The input locations in the input buffer 505 can each store one or more data portions of a data packet. The output locations in the output buffer 520 can each store one or more data portions of an output data packet (i.e., a data packet generated by the packet processing engine 125). In this way, the pointer table 500 can map data portions in the input buffer 505 to data portions in the output buffer 520, for example to reorder the data portions. In one embodiment, each input buffer 505 can store two data packets. In this way, the input buffer 505 can receive a data packet from an input arbiter 310 while the controller 510 reads another data packet stored in the input buffer 505. In other embodiments, the input buffer 505 can store more or fewer data packets.

The controller 510 reads data portions in the input buffers 505 based on the pointer table 500 and provides the data portions to the processor 515. In turn, the processor 515 performs one or more operations on the data portions according to the packet processing scenario and provides the data portions to the output buffer 520. Additionally, the controller 510 identifies header information in the data packets and provides the header information to the packet framer 522. In turn, the packet framer 522 uses the header information to generate a header for the generated data packet. For example, the packet framer 522 may use a destination address in the header to determine a destination address for a generated data packet. The packet framer 522 receives the data portions from the output buffer 520 and the header information from the controller 510, generates a data packet based on the pointer table 500, the data portions, and the header information, and provides generated data packet to the output buffer 320 (FIG. 3). In one embodiment, the processor 515 includes the controller 510.

In some embodiments, the packet framer 522 generates multiple data packets based on the data portions received from the output buffer 520. The data packets include the same destination identifier but each of the data packets may include a unique destination address. The packet framer 522 can generate the destination addresses for the data packets, for example, based on a destination address received from the controller 510 (FIG. 5) or based on a start address and address offset stored in the configuration registers 145 (FIG. 1). In one embodiment, the packet framer 522 can generate the destination addresses based on a stop address stored in the configuration registers 145. In this embodiment, a first destination address is the start address and a subsequent destination address is determined by adding the address offset to the previous destination address until the stop address is reached. The next destination address then wraps around to the start address.

In one embodiment, the packet processing engine 125 uses dynamic packet accumulation to accumulate data packets in the input buffers 505 before processing the data packets according to a packet processing scenario. The packet processing engine 125 accumulates the data packets in the input buffers 505 within an accumulation period before processing the data packets according to the packet processing scenario. The packet processing engine 125 may start the accumulation period at the arrival time of a first data packet to be processed according to the packet processing scenario. If a data packet required for a packet processing scenario arrives after the accumulation period, the packet processing engine 125 replaces the data packet with a default data packet having a default data payload. For example, the default data payload may include data bits each having a value of zero. As another example, the default data payload may include data bits each having a value of one. The packet processing engine 125 processes the data packets received within the accumulation period, including any replacement data packets, to generate one or more data packets. Further, the packet processing engine 125 provides each generated data packet to the output buffer 320 (FIG. 3) of the packet processor 120.

The dynamic packet accumulation process described above can provide significant flexibility in system synchronization of the packet switch 100. According to some embodiments of the present invention, the packet processing engine 125 starts an accumulation period for a packet processing scenario when a first data packet associated with the packet processing scenario is received by the packet processing engine 125. This allows for initialization of the packet processing engine 125 before bringing up transmitters connected to the packet switch 100 because each packet processing scenario is performed after the packet processing engine 125 begins receiving data packets.

In one embodiment, the packet processing engine 125 can generate an initialization signal to start the accumulation period of a packet processing scenario. In another embodiment, the packet processor 120 can generate an initialization signal for multiple packet processing scenarios, such as a group packet processing scenario, to start the accumulation period for the multiple packet processing scenarios at substantially the same time.

In one embodiment, the packet processor 120 performs packet processing scenarios in a time-division multiplexed (TDM) mode of operation. In this embodiment, an accumulation period is selected such that each packet processing scenario can be processed within the accumulation period. For example, the accumulation period can be the longest processing time among packet processing scenarios performed by the packet processor 120. Further, the packet processor 120 may be configured to transmit the data packets generated by the packet processing engines 125 in the accumulation period to the output interface 130 in parallel. For example, the packet switch 100 may initiate transmission of the data packets generated in an accumulation period at the start of a subsequent accumulation period.

In a further embodiment, the packet processing engine 125 includes an optional synchronization module 525 coupled to the input buffer 505, the controller 510, and the packet framer 522. The synchronization module 525 monitors the timing of the data packets received at the input buffer 505 and provides timing information to the controller 510. The controller 510 uses the timing information, for example, to determine an accumulation period for a packet processing scenario. Additionally, the synchronization module 525 can provide timing information to the packet framer 522 for the time-division multiplexed mode of operation.

In one embodiment, the configuration registers 145 (FIG. 1) of the packet switch 100 (FIG. 1) include the configuration registers 530 of the packet processing engine 125. In this embodiment, the configuration registers 530 are user-configurable through the communication interface 150 or the input interface 115. In this way, a user can configure the packet processing scenario performed by the packet processing engine 125.

Figure 6:
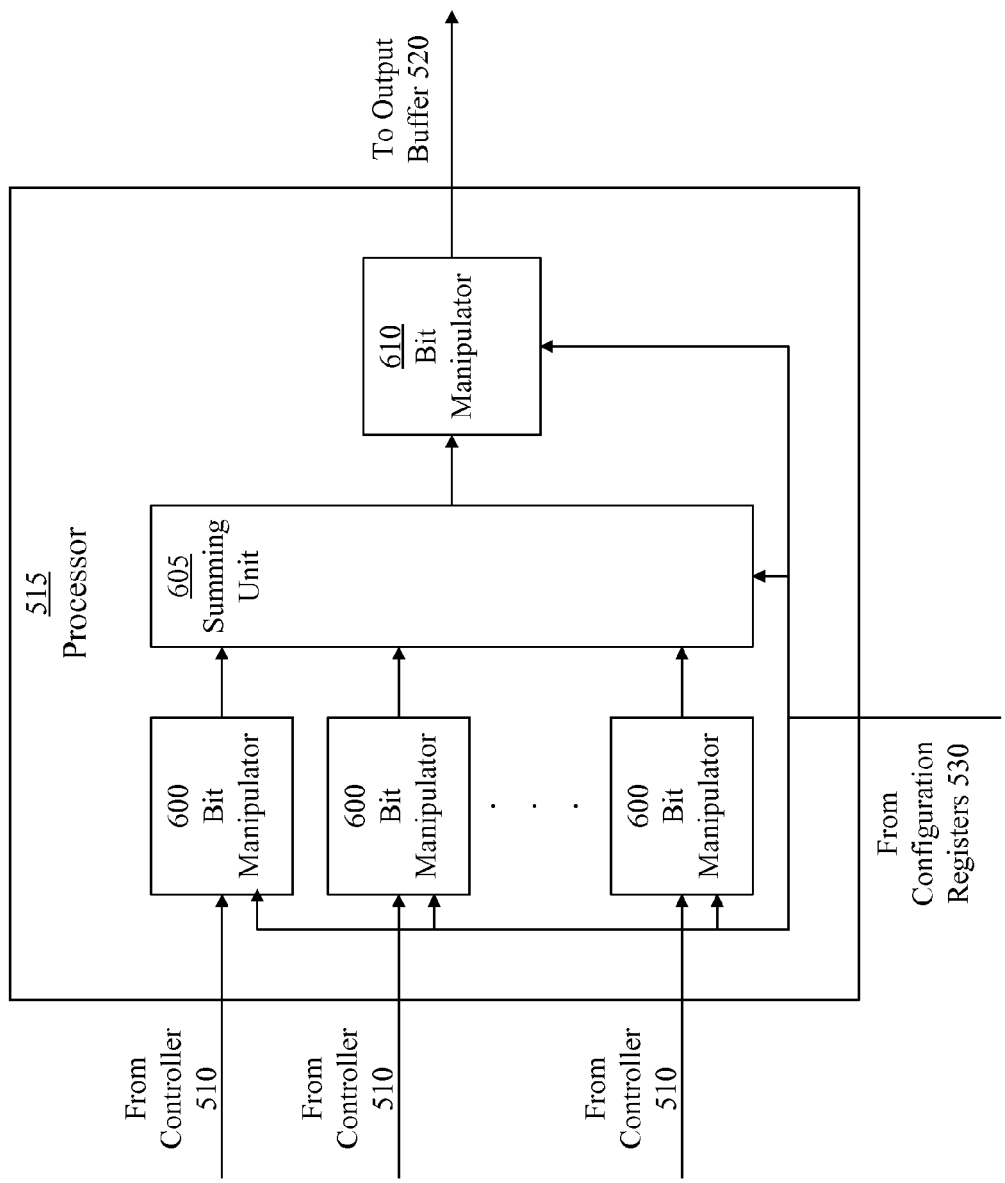
FIG. 6 is a block diagram of a processor, in accordance with an embodiment of the present invention.

FIG. 6 illustrates the processor 515, in accordance with an embodiment of the present invention. The processor 515 includes bit manipulators 600, a summing unit 605, and a bit manipulator 610. The bit manipulators 600 are each coupled to the controller 510 (FIG. 5) and to the summing unit 605. The bit manipulator 610 is coupled to the summing unit 605 and the output buffer 520 (FIG. 5). Additionally, the bit manipulators 600, the summing unit 605, and the bit manipulator 610 are each coupled to the configuration registers 530 (FIG. 5). The configuration registers 530 store configuration data for configuring the bit manipulators 600, the summing unit 605, and the bit manipulator 610 to perform a packet processing scenario.

The bit manipulators 600 each perform operations on data portions received from the controller 510 (FIG. 5) according to the packet processing scenario defined by configuration data stored in the configuration registers 530 (FIG. 5). For example, the bit manipulators 600 can perform deinterleaving, sign extension, truncation, and/or dynamic ranging operations on the data portions. The summing unit 605 performs summation operations on data portions received from the bit manipulators 600 according to the packet processing scenario. Additionally, the summing unit 605 can perform dynamic/saturation ranging on the data portions.

The bit manipulator 610 performs flipping (e.g., MSB/LSB), IQ ordering, and/or IQ interleaving operations on the data portions received from the summing unit 605 according to the packet processing scenario. Additionally, the bit manipulator 610 can perform masking operations on the data portions. The bit manipulator 610 provides the processed data portions to the output buffer 520 (FIG. 5).

Figure 7:
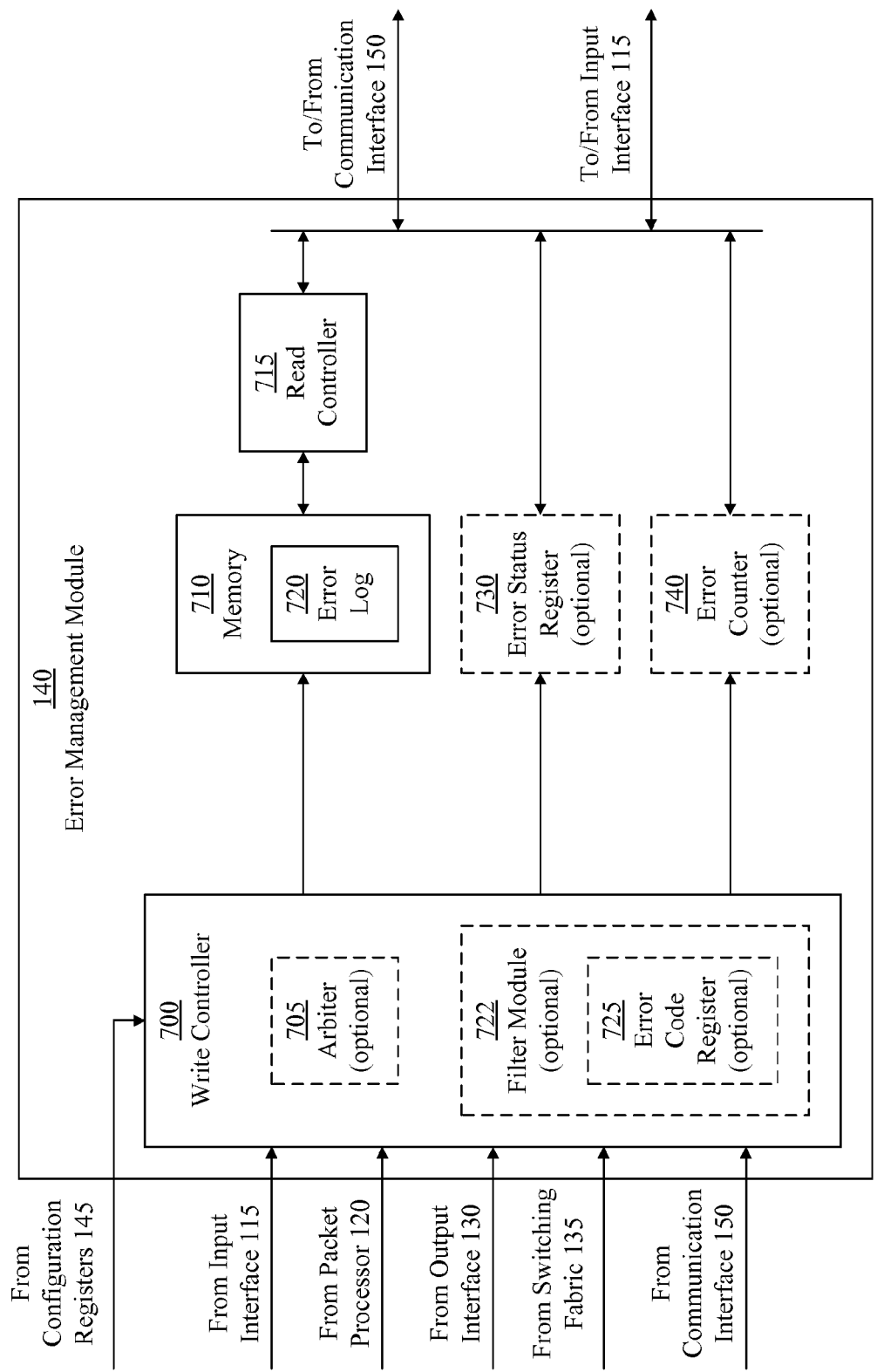
FIG. 7 is a block diagram of an error management module, in accordance with an embodiment of the present invention.

FIG. 7 illustrates the error management module 140, in accordance with an embodiment of the present invention. The error management module 140 includes a write controller 700, a memory 710, and a read controller 715. The write controller 700 is coupled to components of the packet switch 100 (FIG. 1), including the input interface 115 (FIG. 1), the packet processor 120 (FIG. 1), the output interface 130 (FIG. 1), the switching fabric 135 (FIG. 1), the configuration registers 145 (FIG. 1), and the communication interface 150 (FIG. 1). In other embodiments, the write controller 700 may be coupled to more or fewer components of the packet switch 100. Additionally, the write controller 700 is coupled to the memory 710. In some embodiments, the write controller 700 is also coupled to the configuration registers 145. The read controller 715 is coupled to the memory 710 and the communication interface 150. In alternative embodiments, the write controller 700 and the read controller 715 may be the same controller or may be contained in a single controller.

The write controller 700 receives error codes from components of the packet switch 100 (FIG. 1) and writes the error codes into the memory 710 to generate an error log 720 in the memory 710. The error log 710 may be a table of error codes or another data structure containing the error codes. In some embodiments, the write controller 700 is user-configurable. In these embodiments, a user can write configuration data into configuration registers 145 (FIG. 1) to configure the write controller 700. For example, the write controller 700 can be configured to discard an error code received from a component of the packet switch 100 when the error log 720 is full. Alternatively, the write controller 700 can be configured to overwrite the oldest error code in the error log 720 when the error log 720 is full.

In some embodiments, the error write controller 700 includes an optional arbiter 705. The arbiter 705 receives error codes from components of the packet switch 100 and determines an order for writing the error codes into the memory 710. In one embodiment, the arbiter 705 determines an order for writing the error codes into the memory 710 based on a round-robin algorithm. For example, the arbiter 705 can identify the components of the packet switch 100 that generated the error codes received by the error management module 140, select one of the components based on a round robin algorithm, and select an error code received from the selected component.

The read controller 715 receives commands from the communication interface 150 (FIG. 1) and performs the commands to access the error log 720 in the memory 710. The read controller 715 can perform a command to read an error code in the error log 720 and provide the error code to the communication interface 150. In this way, the user can monitor and manage error codes generated in the packet switch 100 (FIG. 1) during operation of the packet switch 100. Moreover, the user can monitor and/or debug the packet switch 100 in real-time during operation of the packet switch 100. In one embodiment, the memory 710 is a FIFO and the read controller 715 reads the error codes in the memory 710 in the order in which the error codes are stored into the memory 710.

In one embodiment, an error code includes an identifier of a component in the packet switch 100 (FIG. 1) and an identifier of an error generated by the component. For example, an error code may include four bits identifying the component of the packet switch 100 and four bits identifying an error associated with the component. In a further embodiment, the error code may identify a subcomponent that generated the error code. For example, the input interface 115 (FIG. 1) can generate an error code identifying an input port 105 (FIG. 1) and an error associated with the input port 105. In other embodiments, an error code may identify a functional group of error codes to which the error code belongs. A group of error codes may contain error codes associated with runtime errors, performance errors, or configuration errors. An example of a runtime error is receiving a data packet in the packet switch 100 having a length greater than a maximum specified length. An example of a performance error is when an output buffer (e.g., output buffer 320) is full and another data packet cannot be written into the output buffer. An example of a configuration error is configuration data supplied by a user that specifies a non-existent output port 110 (FIG. 1).

In a further embodiment, the arbiter 705 provides an acknowledgement to the component of the packet switch 100 that generated the error code. The arbiter 705 may provide the acknowledgement to the component that generated the error code after the arbiter 705 selects the error code. The acknowledgement indicates that the error management module 140 received the error code from the component. Further, the component that generated the error code is inhibited from providing the same error code to the error management module 140 more than once until the component receives an acknowledgement for that error code. The component that generated the error code may also be inhibited from generating the same error code more than once until the component receives the acknowledgement for the error code. In this way, the number of error codes received by the error management module 140 from the component is reduced, but the error management module 140 receives at least one error code indicating that an error associated with the error code occurred in the component.

In one embodiment, one or more of the components may each include a counter (not shown) to count each occurrence of an error code until the component receives an acknowledgement for the error code from the error management module 140. The error management module 140 can access the counter to determine the number of occurrences of the error code. The component resets the counter when the component receives an acknowledgement for the error code from the error management module 140.

Decreasing the number of error codes received by the error management module 140 may decrease the processing load of the error management module 140. As a result, implementations of the error management module 140 may have a decreased size, cost, or complexity. Moreover, decreasing the number of error codes received by the error management module 140 may increase the performance of the error management module 140. For example, the error management module 140 may write an error code into the error log 720 more quickly, which is advantageous for real-time monitoring of the error log 720.

In one embodiment, the write controller 700 includes an optional filter module 722 that filters error codes received from components of the packet switch (FIG. 1) to select one of the error codes during a cycle of the error management module 140. For example, the cycle may be one or more clock periods of a system clock in the packet switch 100. Further, the write controller 700 can write one selected error code into the memory 710 during each cycle. In other embodiments, the write controller 700 can write more than one error code into the memory 710 during a cycle of the error management module 140. Although the filter module 722 is shown in the write controller 700 in the embodiment of FIG. 7, the filter module 722 may be external of the write controller 700 in other embodiments.

In some embodiments, the error management module 140 may include an optional error status register 730. The error status register 730 is coupled to the filter module 722 and the communication interface 150 (FIG. 1). The filter module 722 writes data indicating error codes filtered by the filter module 722 into the error status register 730. The filter module 722 can write data indicating an error code into the error status register 730, for example, by setting a bit associated with the error code in the error status register 730. In this way, the filter module 722 sets a flag for the error code in the error status register 730.

The error status register 730 may be accessed through the communication interface 150 (FIG. 1). For example, a user can access the error status register 730 through the communication interface 150 to read the data stored in the error status register 730 or to clear one or more of the bits in the error status register 730. In another embodiment, the error status register 730 may include logic for generating a control signal based on one or more bits of the error status register 730. For example, the control signal may be an interrupt signal provided to a component of the packet switch 100 (FIG. 1). In this way, the component is notified of an error associated with one or more error codes without the need to access the error status register 730 or the memory 710.

In some embodiments, the error management module 140 includes an optional error counter 740. The error counter 740 is coupled to the filter module 722 and the communication interface 150 (FIG. 1). The error counter 740 maintains a count of error codes filtered by the filter module 722. In one embodiment, the filter module 722 increments the error counter 740 for each error code filtered by the filter module 722. The error counter 740 may be accessed through the communication interface 150. For example, a user can access the error counter 740 through the communication interface 150 to read the error counter 740 or clear the error counter 740 (e.g., set the error counter 740 to zero).

In one embodiment, the filter module 722 filters the error codes before writing data indicating an error code into the error status register 730 or incrementing the error counter 740. The filter module 722 filters the error codes by determining whether each of the error codes received by the filter module 722 is in a collection of error codes. The filter module 722 can determine that an error code is in the collection of error codes by identifying the error code in the collection of error codes. If the filter module 722 identifies the error code is in the collection of error codes, the filter module 722 updates the error status register 730 based on the error code. If the filter module 722 determines the error code is not in the collection of error codes, the filter module 722 filters out (e.g., discards) the error code. The collection of error codes may be a predefined collection of error codes or a user-defined collection of error codes. A user may define the collection of error codes, for example, by writing configuration data into the configuration registers 145 (FIG. 1). In one embodiment, the configuration data for defining the collection of error codes includes wild cards.

In one embodiment, the filter module 722 identifies error codes received from components of the packet switch 100 (FIG. 1) based on configuration data stored in the configuration registers 145 (FIG. 1). For example, the configuration registers 145 may include a bit for each error code and the value of the bit can indicate whether the filter module 722 is to update the error status register 730 for the error code.

In another embodiment, the filter module 722 includes an error code register 725. Each bit of the error code register 725 represents an error code, and the value of the bit indicates whether the filter module 722 is to update the status register 730 for the error code. In some embodiments, the error code register 725 is user-configurable. For example, a user can select the error codes to be filtered by the filter module 722 by writing configuration data into the error code register 725 through the input interface 115 (FIG. 1) or the communication interface 150 (FIG. 1). In one embodiment, the configuration registers 145 (FIG. 1) include the error code register 725.

In some embodiments, the read controller 715 can access the error status register 730 or the error counter 740, or both, and generate a data packet containing data in the error status register 730 or the error counter 740. The switching fabric 135 routes the data packet to the output interface 130 (FIG. 3), and the output interface 130 transmits the data packet to an external recipient of the packet switch 100 (FIG. 1).

In various embodiments, the input interface 115 is coupled to the read controller 715, the error status register 730, or the error counter 740, or any combination thereof. A user can provide a command to the input interface 115 for accessing data in the memory 710, the error status register 730, or the error counter 740. The data is accessed based on the command and is routed through the switching fabric 135 to the output interface 130 and transmitted to an external recipient of the packet switch 100 (FIG. 1).

Figure 8:
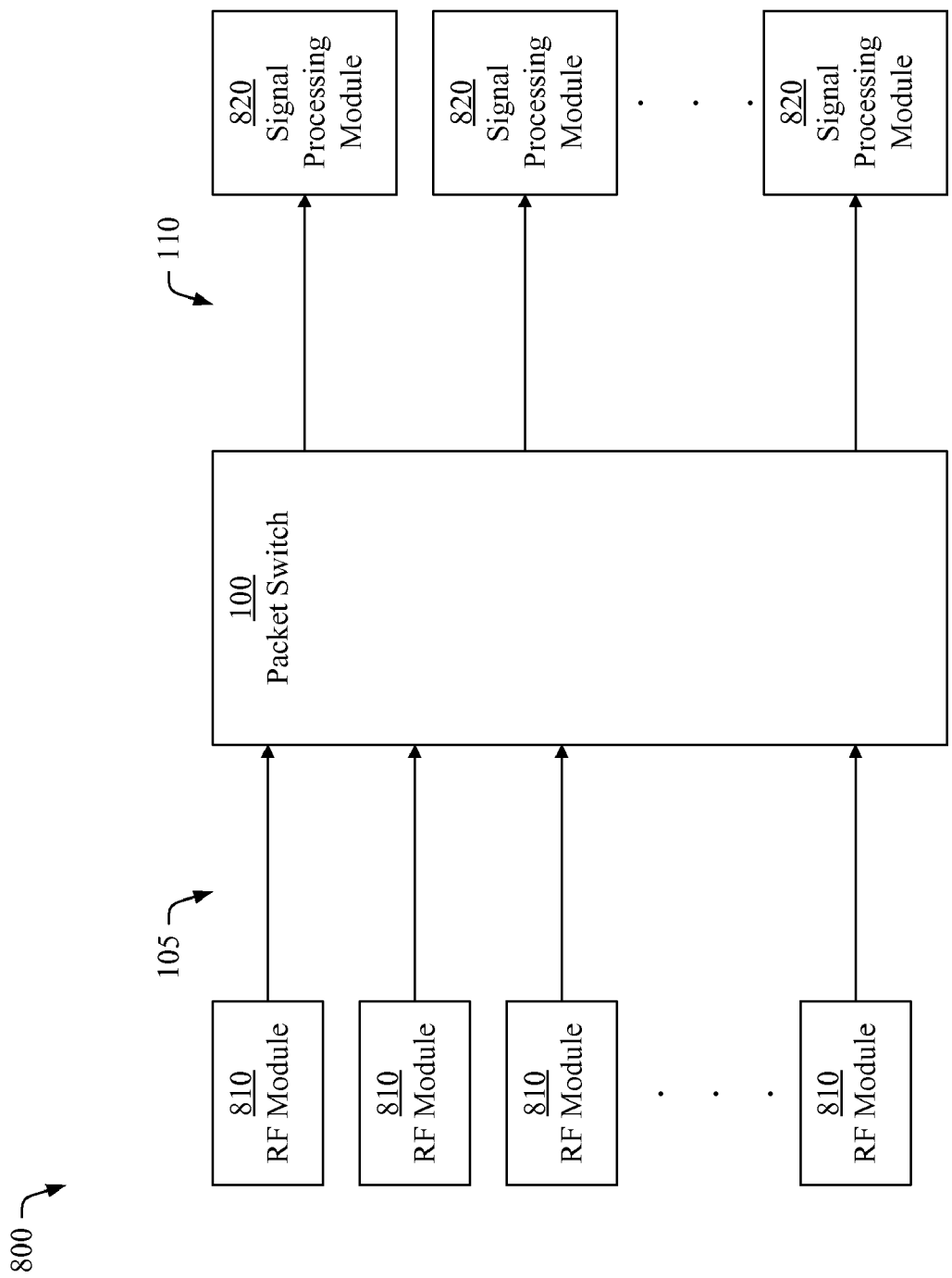
FIG. 8 is a block diagram of a base station containing a packet switch, in accordance with an embodiment of the present invention.

FIG. 8 illustrates the packet switch 100, in accordance with another embodiment of the present invention. As illustrated, the packet switch 100 is contained in an exemplary wireless base station 800. The wireless base station 800 includes radio-frequency (RF) modules 810 coupled in communication with respective input ports 105 of the packet switch 100. For example, the RF module 810 can be an RF card including an RF receiver. The packet switch 100 receives data packets from the RF modules 810 at the input ports 105. The data packets contain data payloads for communications received by the RF modules 810. For example, the data payloads may include digital representations of radio signals received by the RF modules 810.

The wireless base station 800 further includes signal processing modules 820 coupled to respective output ports 110 of the packet switch 100. For example, the signal processing modules 820 can be digital signal processors (DSPs) or chip rate processors (CRPs). The signal processing modules 820 receive data packets from the packet switch 100 and perform operations, such as baseband processing functions, on the data payloads contained in the data packets. For example, the signal processing modules 820 can demodulate and decode the data portions of the data payloads to reproduce a radio signal.

The packet switch 100 receives data packets from the RF modules 810 and can perform packet processing scenarios on the data packets to facilitate operations performed on the data packets by the signal processing modules 820. In this way, the packet switch 100 may reduce the processing load of the signal processing modules 820 and improve the performance of the base station 800.

Figure 9:
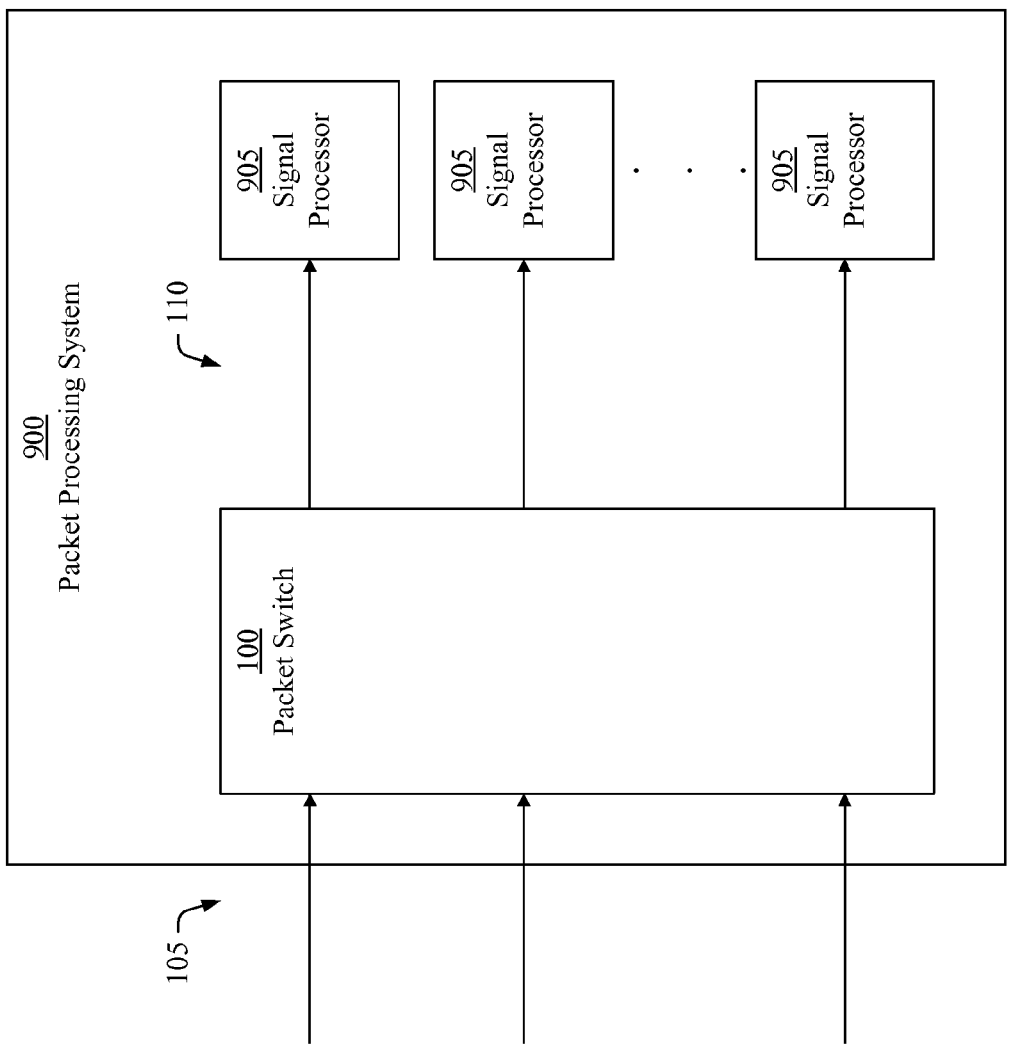
FIG. 9 is a block diagram of a packet processing system, in accordance with an embodiment of the present invention.

FIG. 9 illustrates a packet processing system 900, in accordance with an embodiment of the present invention. The packet processing system 900 includes the packet switch 100 and one or more signal processors 905. The signal processor 905 may be any system or device that processes data packets. For example, the signal processor 905 may include a digital signal processor for performing operations on data payloads of the data packets. Each of the signal processors 905 is coupled to a respective output port 110 of the packet switch 100. The packet switch 100 receives data packets at the input ports 105 and preprocesses the data packets according to one or more packet processing scenarios, as is described more fully herein. The packet switch 100 routes the preprocessed data packets to the signal processors 905, and the signal processors 905 further processes the data packets. Thus, the packet switch 100 and the signal processors 905 cooperate with each other to process the data packets. Moreover, preprocessing the data packets in the packet switch 100 reduces the processing load of the signal processors 905, which may increase the performance and/or throughput of the packet processing system 900.

Figure 10:
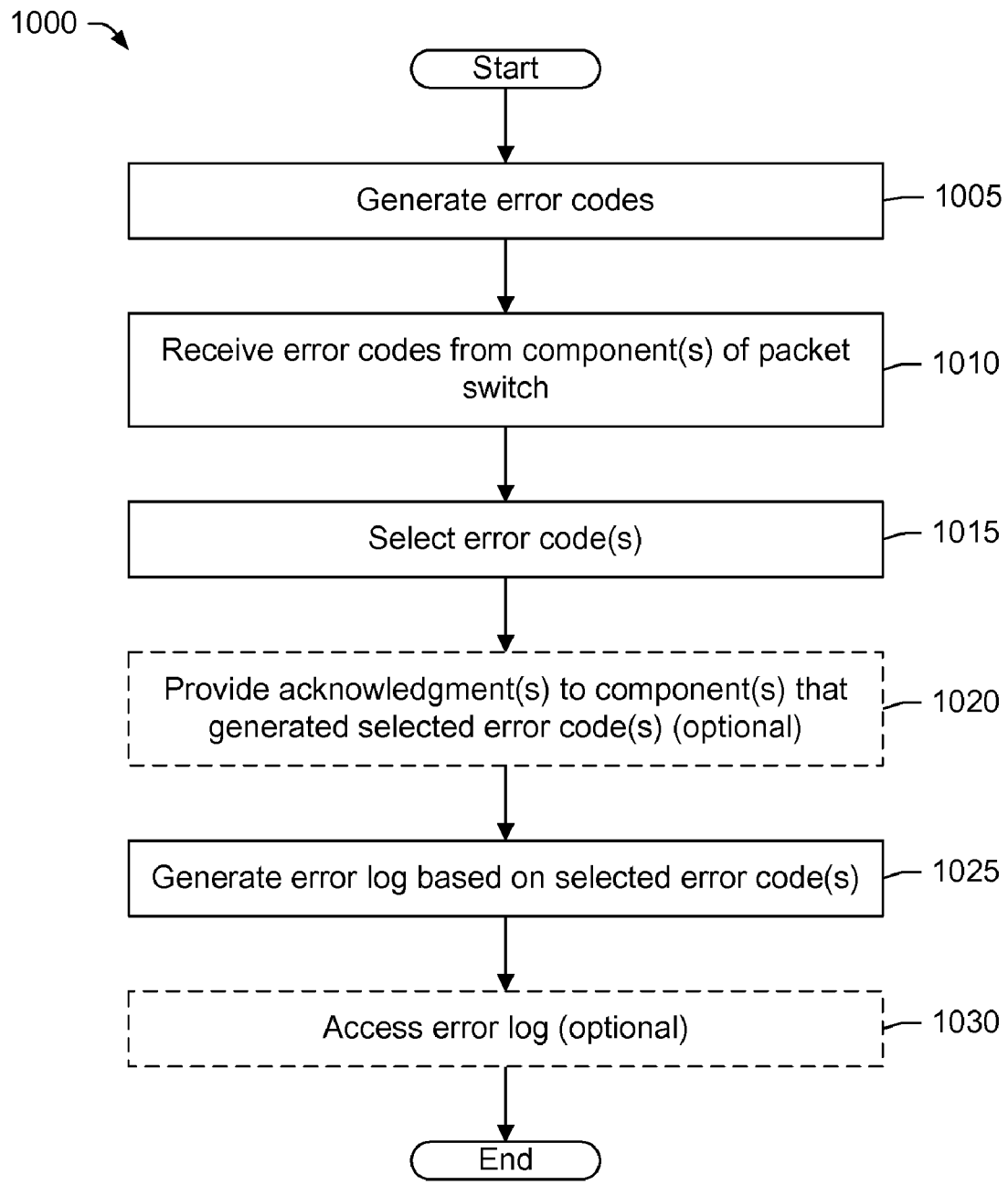
FIG. 10 is a flow chart for a method of managing errors in a packet switch, in accordance with an embodiment of the present invention.

FIG. 10 illustrates a method 1000 of managing errors in the packet switch 100 (FIG. 1), in accordance with an embodiment of the present invention. In step 1005, component(s) of the packet switch 100 (FIG. 100) generate error codes and provide the error codes to the error management module 140 (FIG. 7). The components of the packet switch 100 may include the input interface 115 (FIG. 1), the packet processor 120 (FIG. 1), the switching fabric 135 (FIG. 1), the output interface 130 (FIG. 1), the configuration registers 145, or the communication interface 150 (FIG. 1). The method 1000 then proceeds to step 1010.

In step 1010, the error management module 140 receives the error codes generated by the component(s) of the packet switch 100. The method 1000 then proceeds to step 1015.

In step 1015, the error management module 140 (FIG. 7) selects an error code received from the components of the packet switch 100 (FIG. 1). The method 1000 then proceeds to step 1020.

In optional step 1020, the error management module 140 provides an acknowledgment to the components of the packet switch 100 (FIG. 1) that generated the selected error code. In one embodiment, each component of the packet switch 100 is inhibited from providing the same error code to the error management module 140 more than once until the component receives an acknowledgement for that error code. In a further embodiment, the component is inhibited from generating the same error code more than once before the component receives the acknowledgement for the error code. The method 1000 then proceeds to step 1025.

In step 1025, the error management module 140 (FIG. 7) generates the error log 720 based on the selected error code. In one embodiment, the write controller 700 generates the error log 720 by writing the selected error code into the memory 710. Steps 1015-1025 are repeated for any remaining error code(s) received by the error management module 140 to update the error log 720. The error log 720 may be a table or list of the selected error code(s). Moreover, the error codes in the error log may be ordered according to a sequence in which the error codes are received by the error management module 140. The method 1000 then proceeds to step 1030.

In optional step 1030, the error log 720 is accessed in the memory 710. In one embodiment, the read controller 715 accesses the error log 720 in the memory 710 in response to a command received from a user through the communication interface 150. The read controller 710 can access the error log 720 based on the command to read an error code in the error log 720 and provide the error code to the user through the communication interface 150 (FIG. 1). Additionally, the read controller 715 can access the error log 720 based on a command received from a user through the communication interface 150 to delete an error code from the error log 720. The method 1000 then ends.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A packet switch integrated circuit, comprising:
    an error management module; and
    at least one component configured to facilitate routing of data packets through the packet switch and to generate a first plurality of error codes, each error code of the plurality of error codes identifying an error occurring in the packet switch, the at least one component further configured to provide the first plurality of error codes to the error management module, the error management module configured to select at least one error code in the first plurality of error codes and to generate an error log in the packet switch comprising the at least one selected error code, wherein a first component of the at least one component is configured to generate a first error code of the at least one selected error code, the error management module is further configured to generate an acknowledgment based on the first error code, the first component is further configured to receive the acknowledgement, and the first component is inhibited from providing the first error code to the error management module more than once before the first component receives the acknowledgement.

2. The packet switch of claim 1, wherein the first component is inhibited from generating the first error code more than once before the first component receives the acknowledgment.

3. The packet switch of claim 1, wherein each error code of the first plurality of error codes identifies a component of the at least one component and an error occurring in the component.

4. The packet switch of claim 1, wherein the error management module is further configured to filter the first plurality of error codes by identifying the at least one selected error code in a second plurality of error codes.

5. The packet switch of claim 4, wherein the second plurality of error codes is configurable.

6. The packet switch of claim 1, wherein the at least one component comprises:
a switching fabric for routing data packets;
a packet processor for processing data packets; and
an interface coupled to the switching fabric and the packet processor, the interface configured to receive a data packet and to route the data packet to either the switching fabric or the packet processor based on a destination identifier in the data packet.

7. A method for managing errors in a packet switch, the method comprising:
generating a first plurality of error codes by at least one component of the packet switch, each error code of the plurality of error codes identifying an error occurring in the packet switch;
selecting at least one error code in the first plurality of error codes, wherein a first error code of the at least one selected error code is generated by a first component of the at least one component;
receiving the first error code at an error management module of the packet switch;
generating an error log in the packet switch, the error log comprising the at least one selected error code;
generating an acknowledgment in response to receiving the first error code;
receiving the acknowledgment at the first component; and
inhibiting the first component from providing the first error code to the error management module more than once before receiving the acknowledgment at the first component.

8. The method of claim 7, further comprising inhibiting the first component from generating the first error code more than once before receiving the acknowledgment at the first component.

9. The method of claim 7, wherein each error code of the first plurality of error codes identifies a component of the at least one component and an error occurring in the component.

10. The method of claim 7, wherein selecting the at least one error code comprises identifying a first error code of the at least one selected error code in a second plurality of error codes.

11. A packet switch integrated circuit comprising:
means in the packet switch for routing data packets through the packet switch;
means in the packet switch for generating a plurality of error codes, each error code of the plurality of error codes identifying an error occurring in the packet switch;
means in the packet switch for selecting at least one error code in the plurality of error codes, wherein a first error code of the at least one selected error code is generated by a component of the packet switch;
means in the packet switch for generating an error log based on the at least one selected error code;
means in the packet switch for receiving the first error code from the component of the packet switch;
means in the packet switch for generating an acknowledgement in response to receiving the first error code from the component of the packet switch; and
means in the packet switch for inhibiting the component from generating the first error code more than once before the component receives the acknowledgement.

12. The packet switch of claim 11, further comprising means for processing data packets.

13. A system comprising:
a packet switch configured to preprocess data packets by performing operations on data payloads of the data packets to facilitate baseband processing operations on the data packets, the packet switch comprising:
an error management module; and
at least one component of the packet switch configured to facilitate routing of data packets through the packet switch and to generate a first plurality of error codes, each error code of the plurality of error codes identifying an error occurring in the packet switch, the at least one component further configured to provide the first plurality of error codes to the error management module, the error management module configured to select at least one error code in the first plurality of error codes and to generate an error log in the packet switch comprising the at least one selected error code, wherein a first component of the at least one component is configured to generate a first error code of the at least one selected error code, the error management module is further configured to generate an acknowledgment based on the first error code, the first component is further configured to receive the acknowledgement, and the first component is inhibited from providing the first error code to the error management module more than once before the first component receives the acknowledgement; and
at least one signal processor coupled to the packet switch, the at least one signal processor configured to receive the preprocessed data packets from the packet switch and to further process the data packets by performing baseband processing operations on the data payloads of the data packets.

14. The packet switch of claim 1, wherein the packet switch further comprises a packet processor configured to preprocess the data packets by performing operations on data payloads of the data packets to facilitate baseband processing operations on the data packets.

15. The packet switch of claim 14, wherein the first component is the packet processor.

16. The method of claim 7, further comprising preprocessing the data packets in the packet switch by performing operations on data payloads of the data packets to facilitate baseband processing operations on the data packets.

17. The method of claim 16, further comprising performing baseband processing operations on the data payloads of the data packets to further process the data packets.

18. The method of claim 7, wherein the at least one component comprises a switching fabric for routing data packets, a packet processor for processing data packets, and an interface coupled to the switching fabric and the packet processor, the method further comprising:

receiving a data packet at the interface; and routing the data packet to either the switching fabric or the packet processor based on a destination identifier in the data packet.

19. The packet switch of claim 11, further comprising means for preprocessing the data packets by performing operations on data payloads of the data packets to facilitate baseband processing operations on the data packets.

20. The system of claim 13, wherein the at least one component comprises:

a switching fabric for routing data packets;

a packet processor for processing data packets; and an interface coupled to the switching fabric and the packet processor, the interface configured to receive a data packet and to route the data packet to either the switching fabric or the packet processor based on a destination identifier in the data packet.

* * * * *